T. RICH.
Churn.
No. 76,815.
Patented April 14, 1868.
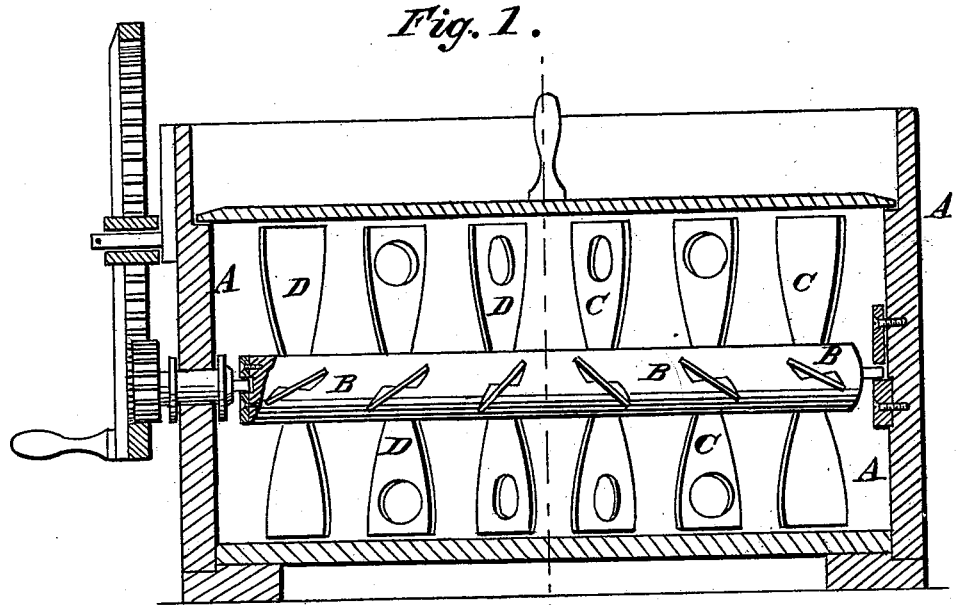
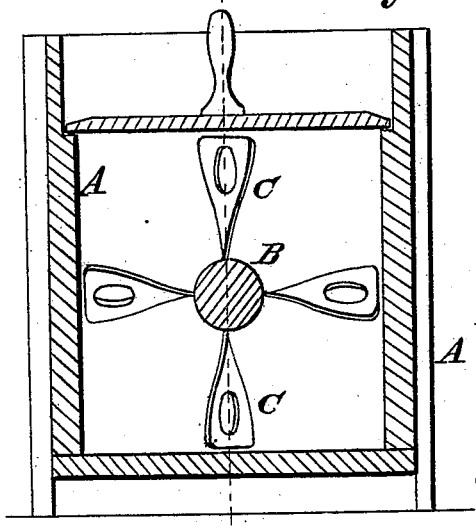
Witnesses:
A. V. Brilsen
H. E. Mead
Inventor:
Thomas Rich.

United States Patent Office.

THOMAS RICH, OF KINGSTON, NEW YORK.

Letters Patent No. 76,815, dated April 14, 1868.

IMPROVEMENT IN CHURNS.

*The Schedule referred to in these Letters Patent and making part of the same.*

TO ALL WHOM IT MAY CONCERN:

Be it known that I, THOMAS RICH, of Kingston, in the county of Ulster, and State of New York, have invented a new and improved Churn; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved churn.

Figure 2 is a vertical transverse section of the same.

Similar letters of reference indicate corresponding parts.

This invention relates to a new churn of that class in which a horizontal rotary dasher is employed within the churn or box, the dasher consisting of wings set around a horizontal shaft.

My invention consists in making such dashers as are set around a horizontal shaft, and which are twisted like propeller-blades, and which are set from the centre towards the two ends of the shaft in opposite directions, so as to feed the cream from the ends toward the centre, perforated with a view to facilitate their free passage through the cream, and to allow the use of a smaller amount of power to operate the dasher.

A, in the drawing, represents the box or case of the churn, made of wood or other suitable material, of suitable size and shape. B is the norizontal shaft, having its bearings in the ends of the box, and receiving rotary motion from suitable mechanism. On the shaft are mounted two sets of propeller-blades, C and D, those on one end of the shaft being set in the reversed direction to those on the other end, as is clearly shown, with a view to feed the cream from the ends towards the middle of the box. Some or all of the blades C D are perforated, as shown. Thereby the cream, which, by the screw-blades, receives longitudinal motion within the box, and which is struck by the blades, also being forced through the holes, receives a transverse motion, and is thus better agitated than if the blades were solid.

Having described my invention, I claim as new, and desire to secure by Letters Patent—

The twisted blades C D, when set in reverse direction upon the shaft B, the outer blades of each series being entire or without perforations, the inner ones being perforated as shown and described.

THOMAS RICH.

Witnesses:
WM. F. McNAMARA,
A. V. BRIESEN.